United States Patent
Wu

[11] Patent Number: 6,102,169
[45] Date of Patent: Aug. 15, 2000

[54] ADJUSTABLE TORSION DAMPER

[76] Inventor: Chin-Long Wu, No. 136-12, Young Ho Road, Ta-Ya Hsiang, Taichung Hsien, Taiwan

[21] Appl. No.: 09/198,408

[22] Filed: Nov. 24, 1998

[51] Int. Cl.⁷ ................................. F16F 15/03; F16F 9/53
[52] U.S. Cl. ........................... 188/267; 482/63; 482/908; 267/154; 267/273; 267/140.15
[58] Field of Search ...................... 482/903, 908, 482/127, 131, 121, 57, 63, 5, 6, 7, 9, 137; 267/154, 273, 277, 140.15; 188/161, 267, 164, 158; 310/105, 93, 103

[56] References Cited

U.S. PATENT DOCUMENTS

| | | |
|---|---|---|
| 4,257,497 | 3/1981 | Schroeder . |
| 5,014,981 | 5/1991 | Prelich . |
| 5,031,900 | 7/1991 | Leask . |
| 5,072,930 | 12/1991 | Sun . |
| 5,096,024 | 3/1992 | Wu .......................................... 188/164 |
| 5,236,069 | 8/1993 | Peng ....................................... 188/267 |
| 5,310,392 | 5/1994 | Lo ........................................... 482/903 |
| 5,437,353 | 8/1995 | Wu .......................................... 188/164 |
| 5,685,806 | 11/1997 | Yu . |
| 5,711,404 | 1/1998 | Lee ......................................... 188/267 |
| 5,879,273 | 3/1999 | Wei et al. ............................... 188/264 |
| 6,029,551 | 2/2000 | Wu . |
| 6,042,517 | 3/2000 | Gunther et al. ......................... 188/164 |

*Primary Examiner*—Douglas C. Butler
*Attorney, Agent, or Firm*—Browdy and Neimark

[57] ABSTRACT

An adjustable torsion damper has a mount which is divided in the longitudinal direction thereof into two submounts made of a material conductive to magnetism. Located between the two submounts is a portion nonconductive to magnetism. The mount is provided at an upper end thereof and a lower end thereof with a first round hole and a second round hole. The first round hole runs between the submounts. A magnetic block is rotatably disposed in the first round hole. A rotary shaft is rotatably disposed in the second round hole. The rotary shaft is made of a material conductive to magnetism. The value of torsional moment of the rotary shaft changes along with the magnetic block in motion.

12 Claims, 7 Drawing Sheets

ADJUSTABLE TORSION DAMPER

FIELD OF THE INVENTION

The present invention relates generally to an adjustable torsion damper, and more particularly to a device for bringing about various values of torsional moment to a rotary shaft.

BACKGROUND OF THE INVENTION

The scope of application of the torsion requirements is rather broad. For example, the damping effect of the operation of the pedal rotary axle of the exercise machine is a case in point. The damping effect is generally brought about by the belt friction force for variation of the damping value, or the magnetically conductive belt which is separated from the source of magnetic force by a distance for adjusting the magnitude of the magnetic force. Such conventional dampers as described above are generally cumbersome and complicated in construction in view of the fact that they consist of two wheels, belts, oil pressure cylinder, link rod mechanism, etc.

Once a predetermined value of torsional moment of the conventional adjustable torsion damper is set, the torsional resistances provided by the rotary shaft are always the same no matter how the rotary shaft is angularly rotated. Such a design as described above is not desirable as far as a mechanism having a dead point is concerned. For example, the ankles of exerciser's feet form a dead point relative to the crank arms of the exercise machine at the time when the crank arms are up and down vertically. As a result, the pedaling puts a strain on the exerciser. In other words, as far as a mechanism having a dead point is concerned, the desirable design should include a rotary shaft which has various values of torsional moment in accordance with changes in rotational angle of the rotary shaft.

SUMMARY OF THE INVENTION

It is therefore the primary objective of the present invention to provide an adjustable torsion damper which is compact and simple in construction.

It is another objective of the present invention to provide an adjustable torsion damper with a rotary shaft which can be easily adjusted in torsional moment.

It is still another objective of the present invention to provide an adjustable torsion damper with a rotary shaft which has various values of torsional moment in conjunction with changes in rotational angle of the rotary shaft, so as to eliminate the dead point of the mechanism.

The adjustable torsion damper of the present invention has a mount which is divided along the longitudinal direction thereof into two submounts made of a material of magnetic conductivity. The portion located between the two submounts is not conductive to magnetism. The mount is provided at both ends thereof with a first round hole and a second round hole. The first round hole is located between the two submounts and provided therein with a magnetic block. The second round hole is provided therein with a rotary shaft made of a material of magnetic conductivity. The adjustment in value of torsional moment of the rotary shaft is done by rotating the magnetic block such that the changes in magnetic loop of the magnetic block are brought about.

The objectives, features and functions of the present invention will be more readily understood upon a thoughtful deliberation of the following detailed description of the present invention with reference to the accompanying drawings.

DETAILED DESCRIPTION OF THE INVENTION

Figure 1:
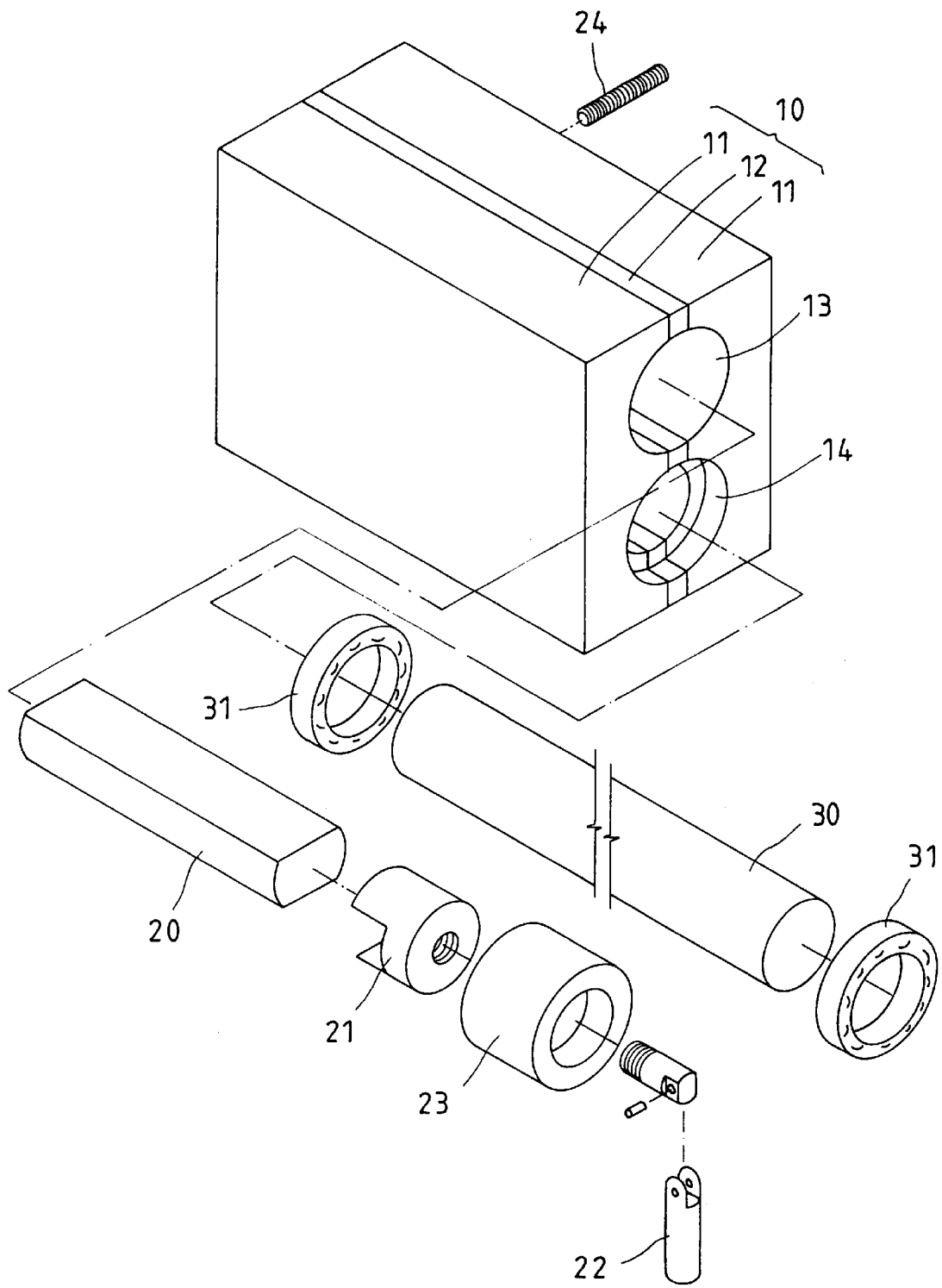
FIG. 1 shows an exploded view of a first preferred embodiment of the present invention.
Figure 2:
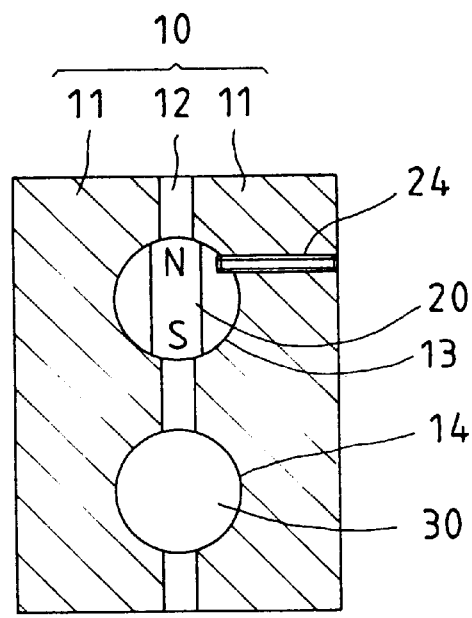
FIG. 2 shows a cross-sectional view of the first preferred embodiment of the present invention in combination, with the rotary shaft being in the state of having the smallest value of torsional moment under the circumstance that the magnetic block is located at a given rotational position.
Figure 3:
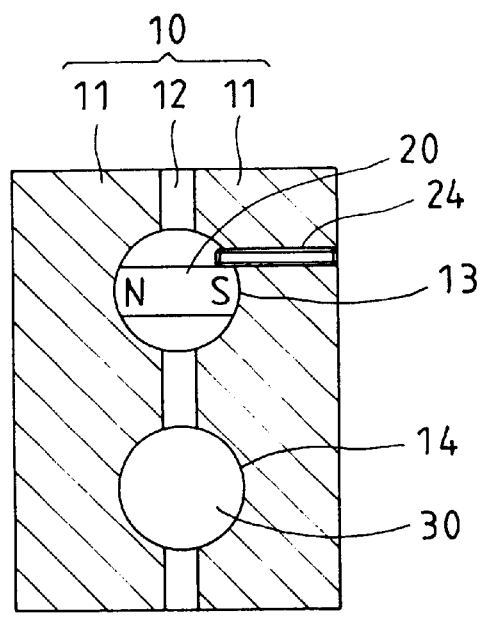
FIG. 3 shows a cross-sectional view of the first preferred embodiment of the present invention in combination, with the rotary shaft being in the state of having the largest value of torsional moment under the circumstance that the magnetic block is located at a given rotational position.

As shown in FIGS. 1–3, an adjustable torsion damper embodied in the present invention has a mount 10 which is divided along the direction of a longitudinal axis thereof into two submounts 11 made of a material of magnetic conductivity. The mount 10 is provided with a partition plate 12 which is located between the two submounts and made of a material nonconductive to magnetism, such as copper. The partition plate 12 is joined with the two submounts 11 by copper welding or copper screws. The mount 10 is provided at both ends thereof with a first round hole 13 and a second round hole 14. The first round hole 13 runs through the submounts 11 and the partition plate 12. A magnetic block 20 of a rectangular construction is rotatably disposed in the first round hole 13. The magnetic block 20 has N and S magnetic poles. The magnetic block 20 is held by a clamping seat 21, which is fastened with a handle 22. The clamping seat 21 is secured to the first round hole 13 by a position confining block 23 such that the magnetic block 20 is disposed stably in the first round hole 13. The clamping seat 21, the handle 22 and the position confining block 23 are made of a material nonconductive to magnetism. The first round hole 13 is provided with a stop block 24 for limiting the magnetic block 20 to turn angularly an angle of about 90 degrees. A rotary shaft 30 is made of a material conductive to magnetism and is rotatably disposed in the second round hole 14. The rotary shaft 30 has a round cross section and is provided respectively at both longitudinal ends thereof with a bearing 31 made of a material nonconductive to magnetism.

As shown in FIG. 2, when the magnetic block 20 turns to remain in the vertical state, the magnetic block 20 and each submount 11 form an induction so as to bring about an inner magnetic flux loop. As a result, the magnetic block 20 can not cause a magnetism conducting action on the rotary shaft 30. For this reason, the value of torsional moment of the rotary shaft 30 is the smallest. As shown in FIG. 3, when the magnetic block 20 turns to remain in the horizontal state, the formation of a magnetic flux loop by the magnetic poles of the magnetic block 20 is blocked by the partition plate 12. As a result, the magnetic flux loop is formed by the magnetism conducting effect of each of the submounts 11 and the rotary shaft 30. The value of torsional moment of the rotary shaft 30 is therefore the largest. In other words, the magnetic block 20 of the present invention is turned to locate at a specific position of rotational angle. The magnitude of the magnetism conducting effect acting on the rotary shaft 30 is dependent on the change in the magnetic flux loop. The magnitude of the torsional moment value is dependent on the magnitude of the magnetism conducting effect. The value of torsional moment of the rotary shaft 30 is controlled by rotating the magnetic block 20 with the handle 22.

Figure 4:
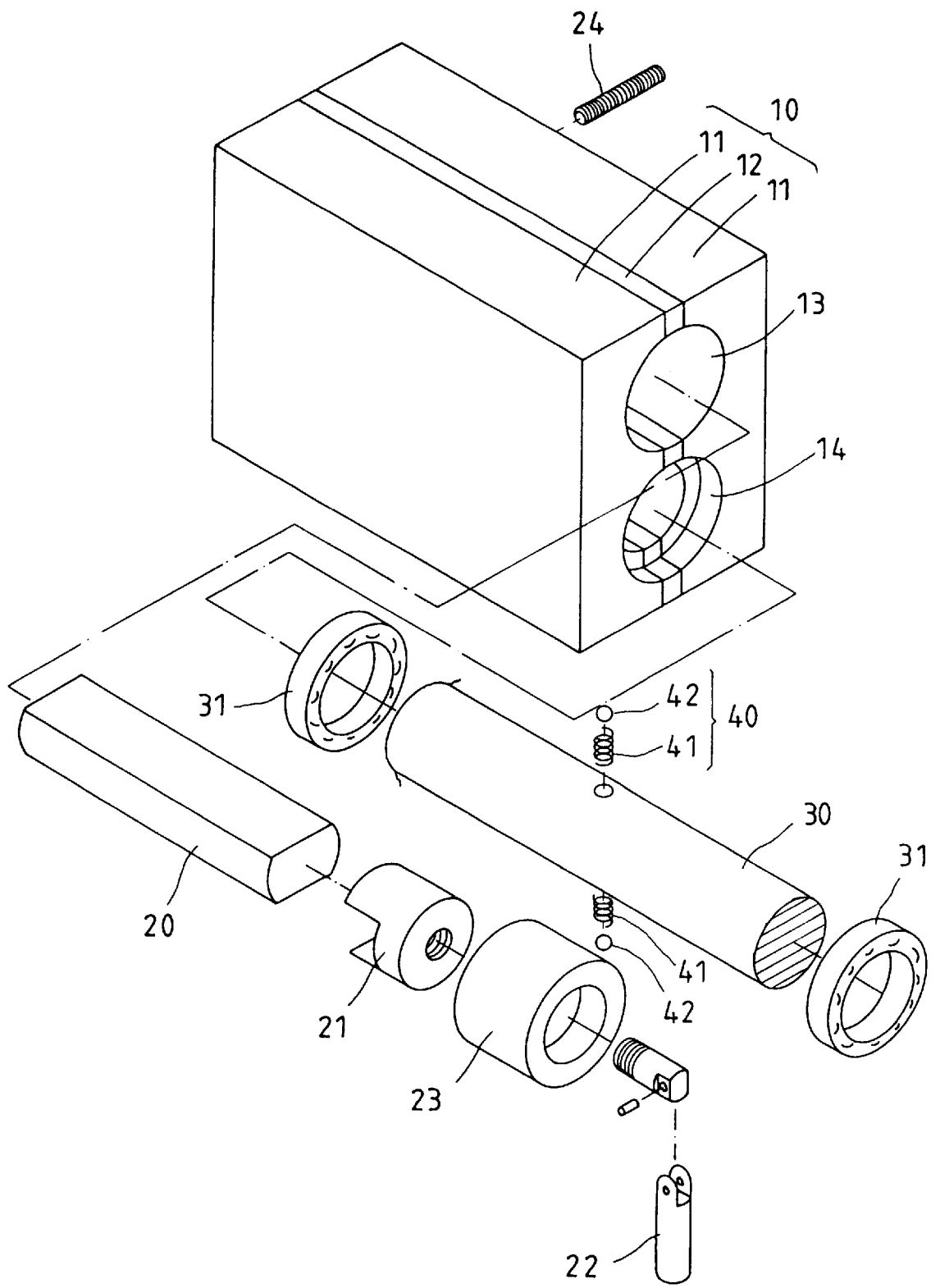
FIG. 4 shows an exploded view of a second preferred embodiment of the present invention.
Figure 5:
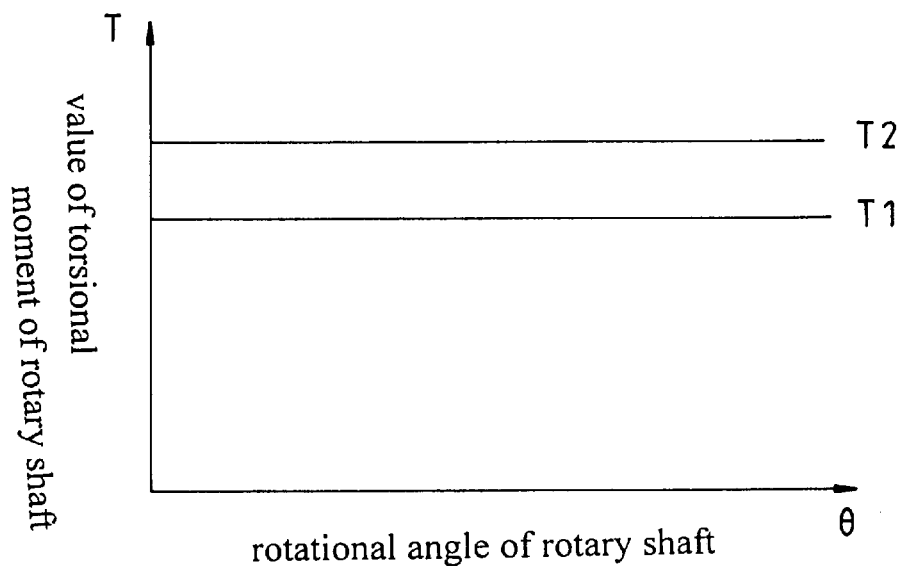
FIG. 5 is a diagram comparing the torsional moments of the rotary shafts of the first preferred embodiment and the second preferred embodiment of the present invention under the same circumstance that the magnetic blocks are located at the same rotational angular position.

As shown in FIG. 4, the second preferred embodiment of the present invention is different from the first preferred embodiment of the present invention in that the former consists of the rotary shaft 30 which is provided with a friction member 40 formed of a spring 41 and a steel ball 42. The steel ball 42 is urged by the spring 41 such that the steel ball 42 urges the inner wall of the second round hole 14 so as to bring about a frictional resistance for enhancing the torsional moment of the rotary shaft 30. Assuming that the magnetic blocks 20 of the first and the second preferred embodiments of the present invention are located at the same position of rotational angle to form the same torsional moment on the rotary shaft 30, the torsional moment T2 of the rotary shaft 30 of the second preferred embodiment is greater than the torsional moment T1 of the torsional moment of the rotary shaft 30 of the first preferred embodiment, as shown in FIG. 5.

Figure 6:
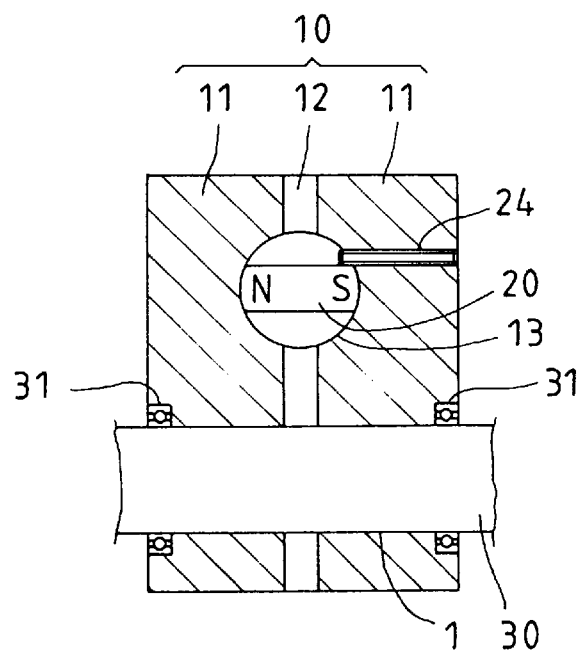
FIG. 6 shows a sectional view of a third preferred embodiment of the present invention.

Now referring to FIG. 6, the third preferred embodiment of the present invention is different from the first preferred embodiment of the present invention in that the former has a horizontally-oriented second round hole 14, and that the rotary shaft 30 of the former is horizontally pivoted. The value of torsional moment of the rotary shaft 30 of the former is changed along with the change in the rotational angle of the magnetic block 20.

Figure 7:
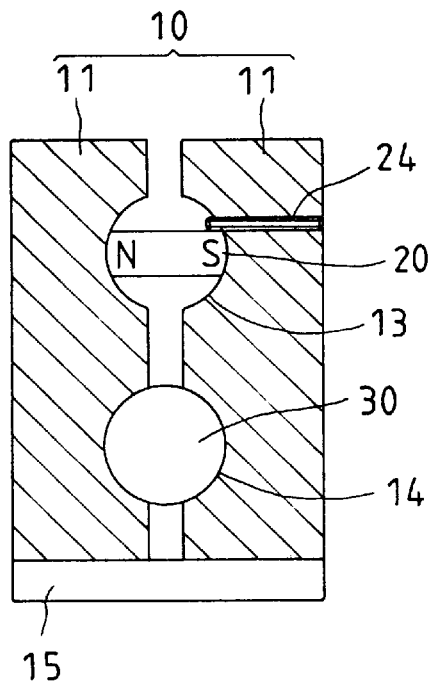
FIG. 7 shows a sectional view of a fourth preferred embodiment of the present invention.

As shown in FIG. 7, the fourth preferred embodiment of the present invention is different from the first preferred embodiment of the present invention in that the former has a mount 10 which is divided into two submounts 11, with a hollow portion located between the two submounts 11. The hollow portion is nonconductive to magnetism. The lower ends of the submounts 11 are connected with a connection plate 15 made of a material nonconductive to magnetism.

Figure 8:
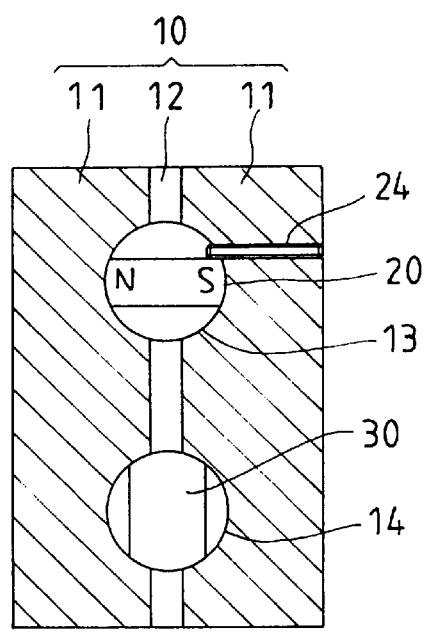
FIG. 8 shows a sectional view of a fifth preferred embodiment of the present invention, with the rotary shaft being located at a rotational position of maximum torsional moment at the time when the magnetic block is located at a specific position.
Figure 9:
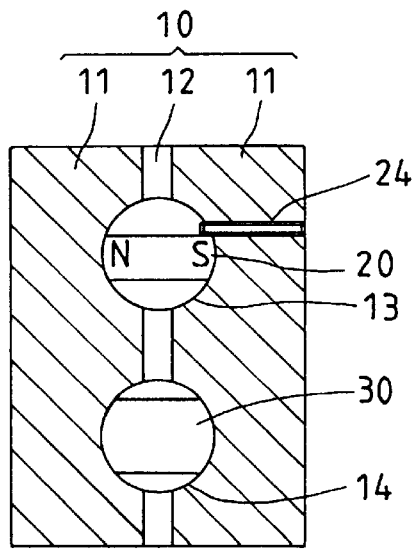
FIG. 9 shows a sectional view of the fifth preferred embodiment of the present invention, with the rotary shaft being located at a rotational position of minimum torsional moment at the time when the magnetic block is located at a specific position.
Figure 10:
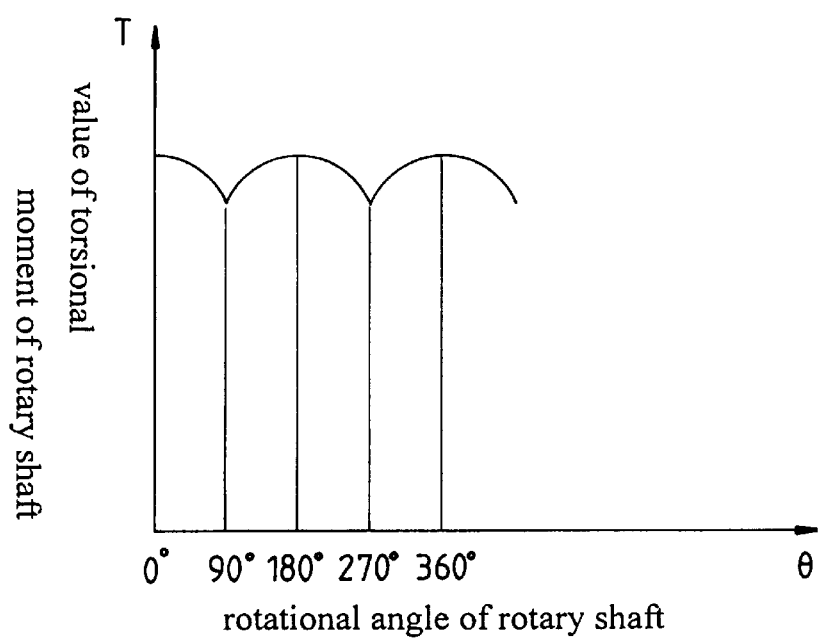
FIG. 10 is a diagram showing the changes in value of torsional moment of the rotary shaft in relation to the changes in rotational angle of the rotary shaft.

As shown in FIG. 8, the fifth preferred embodiment of the present invention is different from the first preferred embodiment of the present invention in that the former has a rotary shaft 30 which is rectangular in its cross section in light of the second round hole 14 being parallel to the first round hole 12. In view of the fact that the cross section of the rotary shaft 30 is not of a circular design, various torsional moments are formed on the rotary shaft 30 even if the magnetic block 20 is fixed at a rotational angle. As shown in FIG. 8, when the rotary shaft 30 is in the vertical state, the path of the magnetic flux loop formed by the magnetic block 20 and the rotary shaft 30 is shortest. As a result, the effect of magnetic conductivity is best. The torsional moment so formed is greatest. As shown in FIG. 9, the rotary shaft 30 is in the horizontal state, the path of the magnetic flux loop formed by the magnetic block 20 and the rotary shaft 30 is longest. As a result, the effect of magnetic conductivity is lower. The torsional moment so formed is smallest. As shown in FIG. 10, various values T3 of torsional moment are resulted from various angles of the rotary shaft 30. As far as the mechanism with dead point is concerned, this is the best application.

Figure 11:
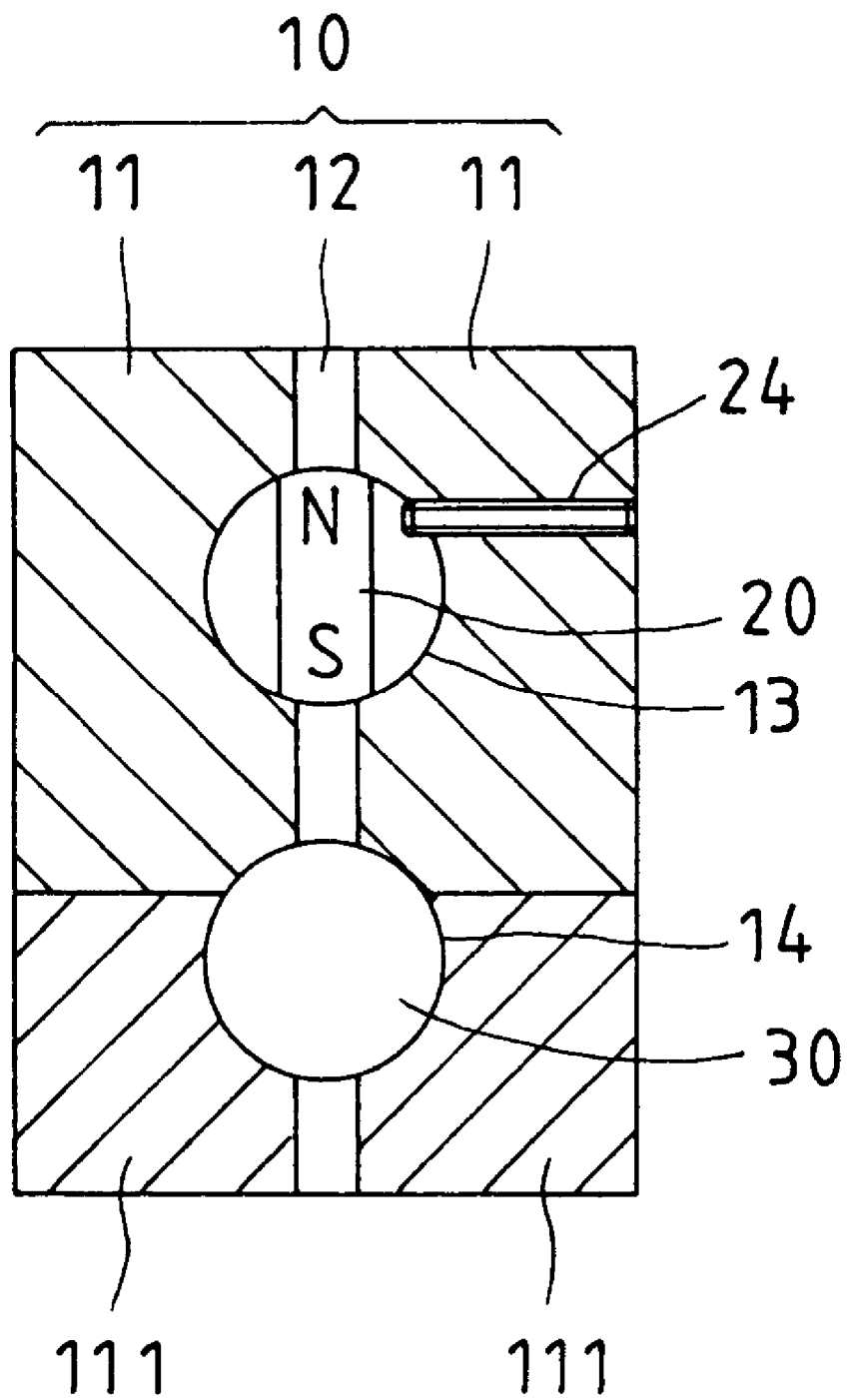
FIG. 11 shows a sectional view of a sixth preferred embodiment of the present invention.

As shown in FIG. 11, the sixth preferred embodiment of the present invention is different from the first preferred embodiment of the present invention in that the former has two submounts 11 which are connected from the lower end of the second round hole 14 with a partition seat 111 made of a material nonconductive to magnetism. The partition seat 111 has a height, which is not higher than the top point of the second round hole 14. The height of the partition seat 111 affects the distribution of magnetic lines of force, as well as the torsional moment of the rotary shaft 30.

The cross sectional profile of the rotary shaft 30 of the present invention is not confined to be round or rectangular. The rotary shaft 30 may be pentagonal, hexagonal, or other geometric forms, in its cross section for forming additional values of torsional moment. In the meantime, the rotary shaft 30 may be made of a material conductive to magnetism for enhancing the intensity of torsional moment. Moreover, the second round hole 14 of the present invention may be so oriented as to form an angle with the first round hole 13. The embodiments of the present invention described above are therefore to be deemed merely as illustrative and not restrictive. Accordingly, the present invention is to be limited only by the scopes of the following appended claims.

What is claimed is:

1. An adjustable torsion damper having a mount which is divided along the direction of a longitudinal axis thereof into two submounts made of a material conductive to magnetism, the two submounts being separated from each other by a portion nonconductive to magnetism, the mount having an upper end and a lower end, which are provided with a first round hole and a second round hole, the first round hole being located between the submounts and provided with a magnetic block fastened pivotally therein, the second round hole being provided with a rotary shaft which is made of a material conductive to magnetism and is pivoted in the second round hole, the rotary shaft having various values of torsional moment along with the rotation of the magnetic block.

2. The adjustable torsion damper as defined in claim 1, wherein said mount is provided with a partition plate located between said two submounts, said partition plate being made of a material nonconductive to magnetism.

3. The adjustable torsion damper as defined in claim 1, wherein said two submounts are connected at a lower end thereof with a connection plate made of a material nonconductive to magnetism.

4. The adjustable torsion damper as defined in claim 1, wherein said magnetic block has a rectangular cross section; wherein said magnetic block is rotatably disposed in said first round hole such that said magnetic block is in contact with an inner wall of said first round hole; and wherein said magnetic block has N pole and S pole.

5. The adjustable torsion damper as defined in claim 1, wherein said rotary shaft has a cross section of any geometric form.

6. The adjustable torsion damper as defined in claim 1, wherein said rotary shaft is made of a material conductive to magnetism.

7. The adjustable torsion damper as defined in claim 1, wherein said magnetic block is engaged with a clamping seat which is in turn engaged with a handle, said clamping seat and said handle being made of a material nonconductive to magnetism.

8. The adjustable torsion damper as defined in claim 1, wherein said rotary shaft is provided at both ends thereof with a bearing which is made of a material nonconductive to magnetism.

9. The adjustable torsion damper as defined in claim 1, wherein said second round hole is oriented in a manner that said second round hole forms an angle with said first round hole.

10. The adjustable torsion damper as defined in claim 1, wherein said rotary shaft is provided with a friction member for providing a rotational friction force between said rotary shaft and said second round hole.

11. The adjustable torsion damper as defined in claim 10, wherein said friction member is disposed in said rotary shaft and formed of a spring and a steel ball which is urged by said spring to press against an inner wall of said second round hole.

12. The adjustable torsion damper as defined in claim 10, wherein said submounts have a lower end which is connected with a partition seat made of a material nonconductive to magnetism, said partition seat having a height lower than a top point of said second round hole.

* * * * *